Figure 1:
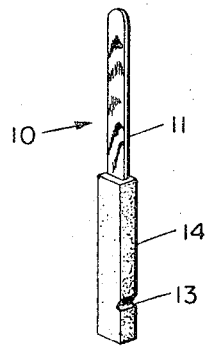

April 4, 1967  E. R. ROSSI ET AL  3,312,555
HANDLE-ANCHORED FORMED SUGAR BLOCK AND
METHOD OF PRODUCING SAME Filed May 12, 1965  2 Sheets-Sheet 1

INVENTORS
EMIL R. ROSSI
BY ALDO A. RAINERO, JR.

ATTORNEY

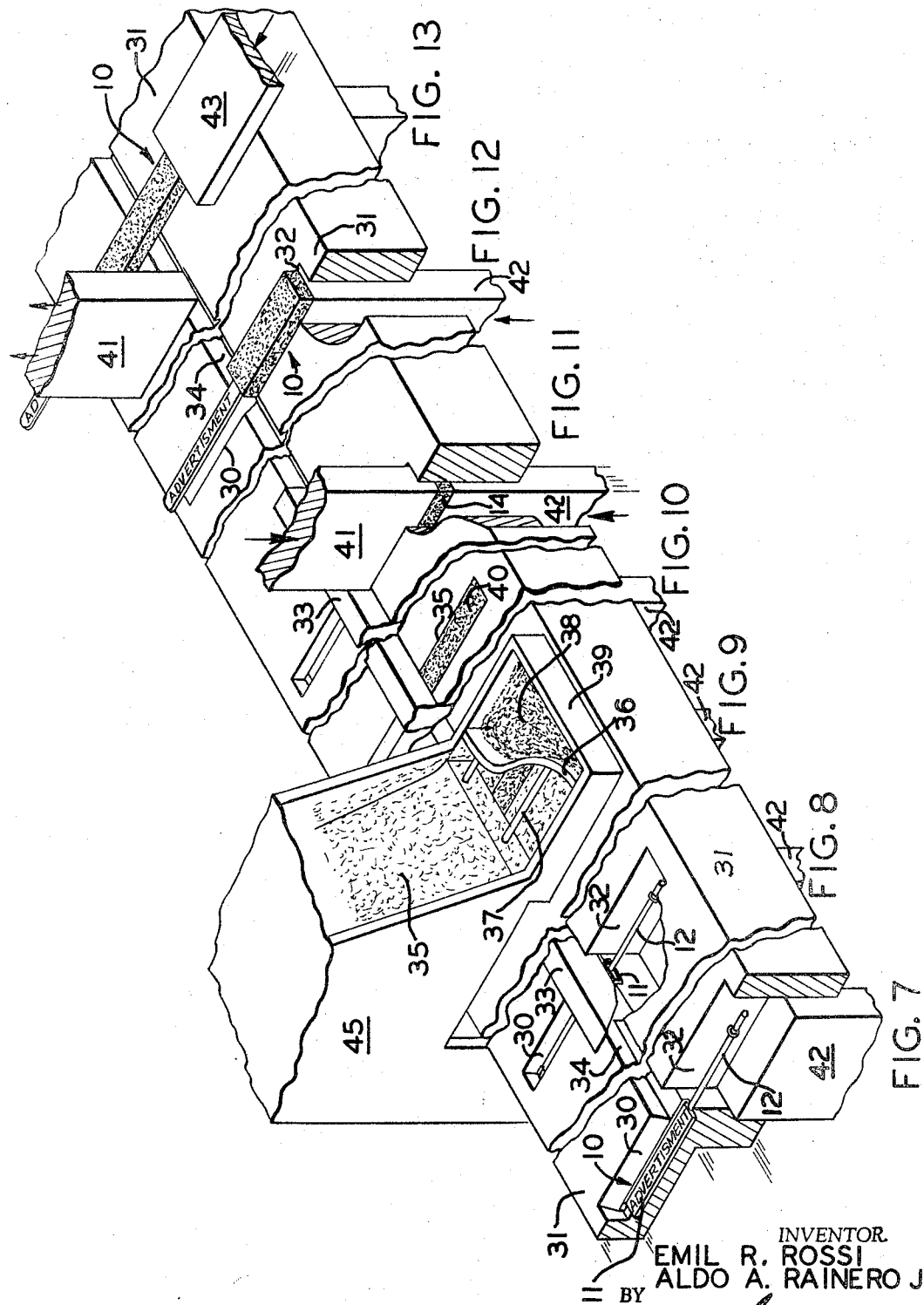

United States Patent Office 3,312,555
Patented Apr. 4, 1967

3,312,555
HANDLE-ANCHORED FORMED SUGAR BLOCK
AND METHOD OF PRODUCING SAME
Emil R. Rossi, 71 Windom Ave., Staten Island, N.Y.
10305, and Aldo A. Rainero, Jr., 810 Henderson, Staten
Island, N.Y. 10310
Filed May 12, 1965, Ser. No. 455,274
3 Claims. (Cl. 99—138)

This application is a continuation-in-part of copending application Ser. No. 374,993, filed on June 15, 1964, by Emil R. Rossi and Aldo A. Rainero, Jr.

This invention deals with a shaped block of sugar which is designed to serve as a stirrer for beverages, and to the method of producing same. More specifically, it relates to a shaped block of sugar of specific composition, in which is imbedded, substantially therethrough, a specially-shaped stick, the latter terminating, externally of the block, as a stirring handle for said sugar.

At the present time, restaurants, food stands, and similar food outlets which serve beverages, such as tea, coffee, chocolate, and the like, serve sugar in the form of a granulated powder, or as molded cubes. These are kept in a container, and a spoon must be provided with the sugar and beverage, for stirring. Not only does this type of serving involve the washing and drying of spoons and sugar containers, but it also incurs loss, through pilferage or damage, of such containers and spoons, as well as the loss of excessive amounts of sugar cubes, when these are served in containers. By means of the present invention, such difficulties have been eliminated.

In the prior art, there have been disclosed various packages and bags containing portions of sugar, as well as straws and perforated metal containers, holding sugar, and intended for individual use. None of these have been able to eliminate the difficulties set forth hereinabove. Also, there have been disclosed various eating utensils and shaped wooden sticks, coated with or embedded in molded and/or frozen confections, such as candy or ice cream. However, the fact still remains that, although such proposals have been made decades ago, it still is a fact that, at present, a customer is given a spoon and separate sugar portions when he orders a beverage in an eating establishment. Wooden spoons have been introduced in an attempt to overcome some of the troubles heretofore mentioned but, due to their cost and ineffectiveness, they have been discontinued in practically most cases.

There has also been proposed a block of sugar shaped like a spoon, in the top of which is inserted the tip of a flat wooden stick. Although it was intended that such spoon be used to stir the beverage until the sugar is dissolved, it has been found that as soon as the liquid beverage becomes absorbed in the block of sugar, the weight of the block, plus the weakening of the block structure through water saturation, caused the block to break off at the handle end portion almost immediately as soon as the stirring commenced.

Molded blocks of sugar have been and are being made commercially by a molding process which involves mixing specially-boiled white sugar with a controlled amount of heavy white syrup to form a self-supporting magma which is set out in molds to stand for some time. A further crystallization of sugar takes place which cements the grains together into a cemented mass, while the uncrystallized syrup drains off. These blocks are dried and packaged. Unfortunately, such a method is impractical for the purposes of this invention since it is slow and laborious.

There have been attempts made to pressure-form sugar blocks around flat wooden sticks, but these have resulted in failure, due to the crumbling of the sugar when such technique of forming is practiced. In attempting to find a suitable composition and process, it was found that sugar crystals cemented by magma or by conventional gummy binders did not result in satisfactory pressed blocks, due to sticking of the material to the punches and dies.

Ordinary cane sugar (sucrose) will not, by itself or with lubricants, press form into self-supporting blocks. However, it has been found that if the sucrose, which is in the form of monoclinic crystals, is admixed with a small amount, say about 3% to about 20%, by weight, of a sugar which crystallizes in needle forms, such as dextrose (glucose) or levulose (fructose), then, with the further addition of a small amount of (say about 0.2% to about 10%, by weight) of lubricant, such as an edible alkaline earth stearate, e.g., calcium or magnesium stearate, then it is possible to pressure form the composition into strong, self-supporting, dense blocks, using a pressure of about 3 to about 15 tons per square inch. In this case, the dry needle crystals are not cemented to the dry sucrose particles. Rather, they appear to serve as a structural framework which, under pressure, serves to enclose the monoclinic sucrose crystal particles. A solid and dry invert sugar, which generally consists of about equal parts of dextrose and levulose, is particularly suitable for the purposes of the present invention.

Attempts to pressure form such a composition around a flat stick did not result in a successful product, either due to flexing of the flat surface of the stick, upon release of the pressure, or to the inability of the sugar crystals to "set," into a permanent position on the flat surface, or to some other unknown effect. Finally, it was found that a suitable block of sugar could be pressure formed with the aforesaid composition in conjunction with a stick, provided a cylindrically-shaped stick were used in the sugar block. The elimination of flat surfaces in the pressure-forming area enabled the production of a formed self-supporting block having a Strong Cobb-Arner hardness of up to 60 kg., or a Stokes hardness of up to 25 kg. A handle-anchored molded sugar is considered to be suitable for commercial use if it possesses a hardness of at least 10 kg., or preferably 25 kg. on the Strong Cobb-Arner hardness testing machine.

According to the present invention, a cube, or other formed shape, of sugar is pressure-formed around a cylindrical stick. The stick is positioned so that it extends substantially through the entire length of the block of sugar, so that it serves as a reinforcement therefor and prevents breaking off of large pieces which would drop to the bottom of the beverage container. The embedded portion of the sick preferably is provided with at least one peripheral rib which serves to prevent slipping off of the stick from the entire block. The handle portion of the stick is preferably flat, so as to be easily gripped and manipulated with the fingers. The block of sugar may have any shape desired, and it may have notches or other indicia to indicate teaspoonfuls, or portions thereof, of sugar.

Figure 2:
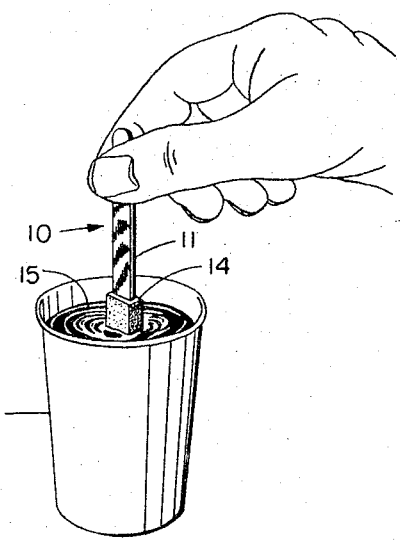
Figure 3:
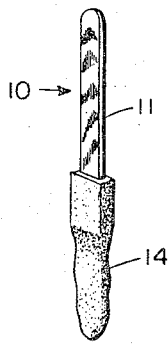
Figures 4, 5, 6:
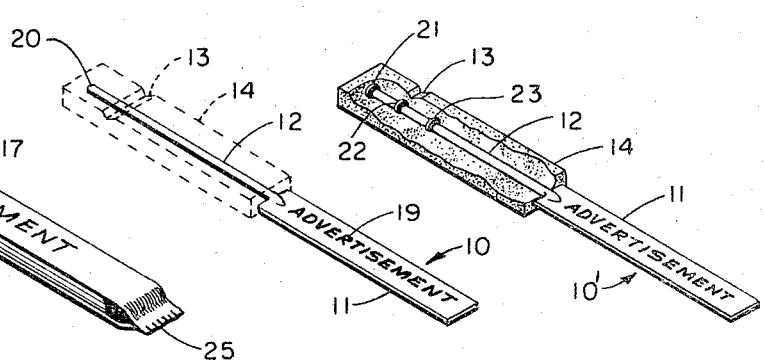

The invention will be more readily understood by reference to the accompanying drawings, in which a preferred embodiment is described, and in which FIGURE 1 illustrates, by a perspective side view, a wooden stick of the present invention carrying, on its bottom portion, a block of pressure-formed sugar. FIGURE 2 shows a similar view, wherein the stick is employed for stirring a beverage, while FIGURE 3 presents a similar view of the same stick after being removed from the beverage, while all of the sugar has not been completely dissolved, showing the uniformity in solubility and the lack of breaking off of portions of the block. FIGURE 4 depicts a similar view of the stirring stick of FIGURE 1, in wrapped and sterile condition. FIGURE 5 illustrates a similar view of a similar stick (with a phantom view of the block), wherein the stick is rounded in shape within the pressure-formed block, while FIGURE 6 depicts a similar view, with the pressure-formed sugar block partly broken away, to reveal the round stick provided with peripheral ribs.

FIGURES 7–13 present schematically the various steps employed in making a pressure-formed handle-anchored sugar block of the present invention. FIGURE 7 illustrates the positioning of the stick in the die cavity. FIGURE 8 illustrates how the handle portion of the stick is sealed off prior to filling, and FIGURE 9 depicts the scraping off of excess sugar by a doctor blade. The filled die cavity, ready for the pressure die is shown in FIGURE 10, while FIGURE 11 depicts the pressure die at the end of its downward stroke. In FIGURE 12, the pressure-formed handle-anchored block is raised out of the cavity and, in FIGURE 13, the product is pushed away out of the press making the latter ready for the next cycle. The same numerals refer to similar parts in the various figures.

Referring again to the drawings, numeral 10 indicates generally a stick made of wood, plastic, or other suitable material, having a preferably flat upper handle portion 11, and a lower cylindrically-shaped sugar-anchoring portion 12. If dseired, a notch 13 may be formed in the sugar block 14 to indicate a unit or partial spoon unit of sugar, as measured from the bottom of block 14.

It will be noted that the anchoring portion 12 of stick 10 extends substantially through the entire length of sugar block 14, so that when stick 10, disposed within the sugar block 14, is used to stir liquid beverage 15 in cup 16, as shown in FIGURE 2, the sugar is uniformly dissolved and, a can be seen from FIGURE 3, there are no portions broken away from the sugar block, due to the fact that stick portion 12 projects substantially throughout the entire length of block 14, and serves as a reinforcement therefor.

It is preferred to package the stick and sugar in a closed wrapper 17, as shown in FIGURE 4, and the wrapper, which may also be crimped at ends 24 and 25, may be imprinted with advertising matter 18, if desired. Thus, the sterile sugar is served with the beverage, and no separate spoon or sugar container are required. This is particularly advantageous when the beverage is carried outdoors, for example, to a car.

As brought out previously, it is necessary to have a cylindrically-shaped stick anchoring portion 12 to avoid crumbling of the block on forming. As shown in FIGURE 5, stick 10 has a rounded embedded portion 12 disposed within sugar block 14. The upper portion 11 of the plastic stick is preferably flat, and it may contain an advertisement 19, if desired. It will be noted that in all cases the embedded portion 12 of the stick extends substantially through the entire length of block 14, it being desirable to leave a small portion of sugar merely to cover the terminus 20 of stick portion 12.

To prevent any possibility of slipping off of block 14 from the surface of rounded stick portion 12, the latter portion of stick 10 may be provided with one or more peripherally (or radially) extending ribs 21, 22 and 23, as shown in FIG. 6.

The pressure-forming operation is preferably carried out in a rotary press having stages, such as those outlined in FIGS. 7–13. For example, stick 10 may be dropped into cavity 30 of die 31, with cylindrical portion 12 of the stick positioned in the forming cavity 32, so that it will be centrally disposed within the formed sugar block. In the next stage (FIG. 8), a guide bar 33 slides in channel 34 over the handle portion 11 of stick 10, and thus holds the stick in place and also seals off cavity 30, and becomes the back wall for cavity 32. Thereafter as cavity 32 slides under powder feeder 45, sugar composition 35 is poured into cavity 32, and a doctor blade 36 operated by rams 37 scrape off excess sugar 38 from over cavity 32, the excess sugar flowing out through an opening in the bottom of bin 39, so that, thereafter, cavity 32 is filled to the measured volume 40, as in FIG. 10.

The next step (FIG. 11) involves a downward movement of punch 41 to compress the sugar to the desired shape and volume 14, after which, punch 41 is raised by an upward movement of lower punch 42 (after guide bar 33 has been slid out of the way). This lifts the finished handle-anchored sugar block 10 above the surface of press 31 (FIG. 12), making it possible for knock off arm 43 (FIG. 13) to push sugared stick 10 out of the way of the press, and thus enable the beginning of a new cycle.

As an example, the following composition may be prepared and mixed together:

|  | Parts by weight |
|---|---|
| Dry cane sugar, crystalline | 90.75 |
| Dry invert sugar, powdered | 8.75 |
| Dry magnesium stearate | 0.50 |

The mixture is fed to a rotary press cavity in which is inserted the cylindrical end of a stick, such as that shown in FIG. 5, and a punch pressure of 15 tons per square inch is applied to the sugar composition, whereupon a stick, similar to that shown in FIG. 1, is obtained. A block thus obtained was found free of cracks and chips, and a hardness test on the Strong Cobb-Arner testing machine showed that the sugar block was able to withstand 48.5 kg. prior to breaking. Hot water (160°) solubility of the block was 12 seconds, and cold water (32°) solubility was 62 seconds, by the U.S.P. solubility method. The dry powder used was of commercial grade and was not specially dried.

Cane sugar suitable for this invention can be a dry crystalline sugar of about 10 mesh up to 325 mesh, or it may be a dry granulated sugar of, for example, 4X, 6X or 10X grade. For the needle-crystal sugar, one can employ dry commercial powdered glucose, dextrose invert, or the like. A suitable dry mixture, containing cane sugar and about 9% by weight of invert sugar, is sold under the name of "Nulofond." As lubricants, calcium and/or magnesium stearates have been found best. The preferred composition range for needle-crystalline sugar is about 5% to about 10% by weight, and for lubricant, the preferred concentration is about 0.3% to about 7% by weight. Preferred punch-pressures are about 8 to about 20 tons per square inch.

The term "cane sugar" employed herein shall be understood to include all forms of sucrose, whether they be obtained from cane, beets, or any other source. It is also to be understood that the sugar composition can contain small quantities of other dry ingredients, such as certified food colors, flavorings, and the like.

We claim:

1. A handle-anchored formed sugar block designed to be used for stirring a beverage in a container, comprising,
    a self-supporting block of dry cane sugar crystals containing about 3% to about 20% by weight of dry sugar crystals in needle form, and about 0.2% to about 10% of an edible, dry, solid lubricant, said block having a hardness value of at least 10 kg. on the Strong Cobb-Arner hardness testing machine, and
    a stick having a cylindrical portion penetrating substantially completely through the entire length of said block, and having a portion extending out of said block to serve as a handle for stirring said block in a beverage.

2. A handle-anchored formed sugar block designed to be used for stirring a beverage in a container, comprising,
    a self-supporting block of dry cane sugar crystals containing about 3% to about 20% by weight of dry invert sugar crystals, and about 0.2% to about 10% of an edible alkaline earth stearate, said block having a hardness value of at least about 10 kg. on the Strong Cobb-Arner hardness testing machine, and a stick having a cylindrical portion penetrating substantially completely through the entire length of said block, and having a flat portion extending out of said block to serve as a handle for stirring said block in a beverage.

3. A process for producing a handle-anchored formed sugar block designed to be used for stirring a beverage in a container, comprising, inserting into a press die cavity a stick having a flat handle portion and a cylindrical portion,
sealing off the handle portion,
pouring around the cylindrical portion a dry powder mixture comprising cane sugar crystals containing about 3% to about 20% by weight of a dry edible sugar in needle crystal form, and about 0.2% to about 10% of an edible, dry, solid lubricant, and compressing said mixture around said cylindrical portion to form a block in a manner such that the said latter stick portion extends substantially completely through the entire length of said block and said block exhibits a hardness value of at least about 10 kg. as determined by the Strong Cobb-Arner hardness tester.

References Cited by the Examiner
UNITED STATES PATENTS

| | | | |
|---|---|---|---|
| 1,668,524 | 5/1928 | Bogue | 99—138 |
| 2,807,559 | 9/1957 | Steiner | 127—59 X |

FOREIGN PATENTS

| | | |
|---|---|---|
| 655,333 | 1/1963 | Canada. |

OTHER REFERENCES

Silver et al.: Manufacture of Compressed Tablets, 1944, page 69.

A. LOUIS MONACELL, *Primary Examiner.*

M. A. VOET, *Assistant Examiner.*